United States Patent [19]

Ravinovitch et al.

[11] 4,424,292

[45] Jan. 3, 1984

[54] INFRARED REFLECTING VINYL POLYMER COMPOSITIONS

[75] Inventors: Elvira B. Ravinovitch, South Euclid; James W. Summers, Bay Village, both of Ohio

[73] Assignee: The B. F. Goodrich Company, Akron, Ohio

[21] Appl. No.: 437,076

[22] Filed: Oct. 27, 1982

Related U.S. Application Data

[63] Continuation-in-part of Ser. No. 355,501, Mar. 8, 1982, abandoned.

[51] Int. Cl.$^3$ .............................................. C08K 3/22
[52] U.S. Cl. ...................................... 524/88; 524/180; 524/407; 524/431
[58] Field of Search .................. 252/587; 524/407, 88, 524/180, 431, 430; 350/1.4; 106/302

[56] References Cited

U.S. PATENT DOCUMENTS 2,206,636  7/1940  Hunter ............................... 524/407
2,610,920  9/1952  Hopkinson ......................... 524/407
2,874,140  2/1959  Kloepfer et al. .................... 524/430
3,291,746 12/1966  Donoian et al. ...................... 524/88

FOREIGN PATENT DOCUMENTS 2719170 11/1978  Fed. Rep. of Germany .

OTHER PUBLICATIONS

Francis T. Elzy & Terry E. Rose: "Additives for Plastics–Colorants," Plastics Engineering, Jul. 1976, pp. 20–24.

Primary Examiner—Veronica P. Hoke
Attorney, Agent, or Firm—Carl W. Battle

[57] ABSTRACT

The invention relates to a vinyl polymer composition suitable for outdoor use in the sunlight. The heat buildup in articles made from the composition is lowered without changing the ultraviolet protection or the color of the articles. This is accomplished by employing in the composition a black infrared reflecting pigment, such as a mixture of $Cr_2O_3$ and $Fe_2O_3$, and other infrared reflecting pigments.

16 Claims, No Drawings

INFRARED REFLECTING VINYL POLYMER COMPOSITIONS

REFERENCE TO RELATED APPLICATION

This application is a continuation in part of Ser. No. 355,501 filed Mar. 8, 1982 now abandoned.

BACKGROUND OF THE INVENTION

Polymeric materials, such as vinyl polymers, and products made therefrom, must exhibit resistance to degradation if they are to have any useful commercial value, particularly for outdoor use, such as in house siding, and the like. The degradation referred to can be a partial or total loss of structural integrity, a darkening or discoloration of the product, a loss of flexibility or resilience, loss of shape due to softening, or a combination of any of these phenomena. The various types of degradation, above referred to, are promoted or catalyzed by oxygen (air), heat, and light, particularly sunlight in the ultraviolet (UV), visible, and infrared (IR) ranges.

In order to protect polymeric materials, it has been the practice heretofore to add various ingredients or stabilizers to the polymers, or compounds thereof, to prevent or inhibit degradation of finished articles made therefrom. These stabilizers work in diverse and complex ways, such that a compound that stabilizes against heat and oxygen degradation in a polymer or resin may not stabilize the same against light degradation, or vice versa. In many instances, to obtain optimum protection, a mixture of compounds, each specifically selected to afford maximum protection against a certain type of degradation, is often used.

It is well known that light energy from the sun causes a temperature rise in articles exposed to the sun. This is a particularly bad problem in the case of vinyl house siding since it causes "oil canning" of the siding which is a surface distortion. Oil canning is caused by the fact that the center of the siding panel is longer than the butt and hanger and the longer center causes a wave in the panel. If the butt and hanger portions have shrunk, then the oil canning will be permanent. For example, the center of the panel, which is in the sun, will be hotter and therefore due to thermal expansion longer than the butt and hanger, which are shaded. To minimize the thermal expansion problem, colors must be chosen which do not absorb too much of the sun's energy and the materials chosen must not have too high a coefficient of liner expansion.

Vinyl, and many other plastic materials, require ultraviolet absorbers for protection during weathering. These absorbers may be organic materials, titanium dioxide, carbon black, etc. However, by absorbing the ultraviolet light, the articles are heated by the ultraviolet and not much can be done to change this heating. Also, pigments which absorb or reflect in the visible light region are sometimes added to give color. However, these pigments absorb the visible light and heat the article by this absorbed light. To change the amount of light absorbed in the visible light region would change the color and, accordingly, nothing can be done to change the visible heat absorbed.

It would be particularly desirable to have pigments, or other materials, which would reflect infrared energy and which would lower the heating of the article without changing the ultraviolet protection or the color thereof. It would be desirable to have a pigment, such as a black pigment, which reflects infrared light. Carbon black pigment has been proposed but, since it absorbs light in the ultraviolet, and infrared regions, it is particularly bad for causing heating of articles.

In the "Encyclopedia of Polymer Science and Technology", (1971), Volume 10, page 165, it is stated that black iron oxides exhibit excellent light-fastness, good weathering resistance and fair to good heat resistance. Also, that brown iron oxides exhibit excellent light-fastness and good resistance to heat. However, there is no indication therein that the iron oxides are infrared reflecting, which is most desirable in vinyl compounds to reduce the heat buildup, and particularly in vinyl house siding which is exposed to the sun.

SUMMARY OF THE INVENTION

It has been found that, by the proper choice of pigments, which reflect infrared energy, the heating of the article, such as vinyl house siding, can be lowered without changing the ultraviolet protection or the color of the article. It has been further found that a black infrared reflecting pigment, such as a mixture of $Cr_2O_3$ and $Fe_2O_3$, which is weatherable, and other infrared reflecting pigments, when employed in vinyl polymer compounds, substantially reduce the heat buildup in articles made therefrom when exposed to the sun. It is important to have a black pigment which reflects infrared light since carbon black is particularly bad for causing heating of articles.

DETAILED DESCRIPTION

The polymeric compositions of the present invention are comprised of a main vinyl polymer material and an infrared reflecting pigment. Also, the compositions may contain a plasticizer for the vinyl polymer. Thus, the vinyl polymer particles should be porous to allow for good penetration of the plasticizer therethrough.

Vinyl polymer, or vinyl polymer material, as used herein, refers to homopolymers and copolymers of vinyl halides and vinylidene halides, such as vinyl chloride, vinyl bromide, vinylidene chloride, etc. The vinyl halides and vinylidene halides may be copolymerized with each other or each with one or more polymerizable olefinic monomers having at least one terminal $CH_2=C<$ grouping. As examples of such olefinic monomers there may be mentioned the $\alpha, \beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylinitrile, methacrylonitrile, and the like; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives, such as -methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art.

The present invention is particularly applicable to homopolymers and copolymers made by the polymerization of vinyl chloride or vinylidene chloride alone or in admixture with one or more polymerizable olefinic monomers copolymerizable therewith in amounts up to about 40% by weight, based on the weight of the monomer mixture. The most preferred vinyl polymer, or resin, is polyvinyl chloride (PVC) and the invention, for simplicity and convenience, will be described in connection therewith, it being understood that this is merely intended in an illustrative sense and not limitative.

The vinyl polymer compositions of the present invention are useful in making any type article which will be exposed to sunlight, and particularly for prolonged periods of time. However, the vinyl polymer compositions are particularly useful in making vinyl house siding wherein weatherability is important and likewise, the reduction of heat buildup in the siding in order to prevent or substantially reduce surface distortion or oilcanning of the siding. The siding may be all one piece, or it may be an extruded composite of a substrate and a capstock thereover. When a composite is employed, the capstock will contain the infrared reflecting pigment.

Irrespective of the article to be made, the proper vinyl chloride polymer should be employed. It is preferred, in most instances, to use PVC and particularly, in making house siding. In any event, the vinyl chloride polymer particles must have good porosity in order to efficiently absorb plasticizer. Solid nonporous polymers must be more highly swollen and require too high a concentration of plasticizer to produce acceptable products or articles. It has been found that vinyl chloride polymer particles containing from about 15% to about 50% by volume of pore space are satisfactory in making products suitable for use outdoors in the sunlight. Preferably, the polymer particles will contain from about 25% to about 35% by volume of pore space.

The amount of plasticizer that is usually employed to give satisfactory results is in the range of about 10 parts to about 40 parts by weight based on the weight of 100 parts of vinyl chloride polymer. Preferably, however, the amount of plasticizer employed will be in the range of about 20 parts to about 30 parts by weight, based on the weight of 100 parts of polymer. The amount of plasticizer employed in the present invention is well below the amounts usually employed in making plasticized vinyl polymers and, particularly, in making PVC plastisols for use in making films, etc., where flexibility is important. When amounts of plasticizer greater than 40 parts by weight per 100 parts by weight of vinyl chloride polymer are used, there is an adverse effect on the article or product resulting in lowering the impact retention thereof upon weathering.

As examples of suitable plasticizers for use in the present invention are the phthalic acid and isophthalic acid diesters of benzyl or phenyl radicals, or alkyl, alkoxyalkyl or cycloalkyl radicals containing from 1 to 24 carbon atoms, and preferably 4 to 16 carbon atoms, such as, for example, diisooctyl isophthalate, butyl benzyl phthalate, diphenyl phthalate, dimethyl phthalate, diisobutyl phthalate, diisoamyl phthalate, diisohexyl phthalate, di-n-hexyl phthalate, di-(2-ethyl hexyl) phthalate, diisooctyl phthalate, di-n-octyl phthalate, butyl nonyl phthalate, butyl decyl phthalate, isooctyl isodecyl phthalate, n-octyl n-decyl phthalate, di(butoxyethyl) phthalate, dicyclohexyl phthalate, and the like. In addition, there are other plasticizers useful in the present invention, such as, for example, diisobutyl adipate, diisooctyl adipate, di-(2 ethyl hexyl) adipate, diisodecyl adipate, isooctyl isodecyl adipate, epoxidized soybean oil, di(2-ethyl hexyl) agelate, diisooctyl agelate, dibenzyl sebacate, dimethyl sebacate, dibutyl sebacate, di-(2-ethyl hexyl) sebacate, diisooctyl sebacate, and the like. Also suitable as plasticizers are the ricinoleates, such as, for example, diethylene glycol monorisinoleate, methyl recinoleate, and the like. Further, triorganophosphates may also be used, such as triphenyl phosphate, cresyl diphenyl phosphate, tributyl phosphate, and the like. The preferred plasticizers for use in the present invention are the liquid phthalate plasticizers, among which di-(2-ethyl hexyl) phthalate or diisodecyl phthalate are particularly good in producing the desired results. A mixture of plasticizers may also be employed, that is, two or more of the above type plasticizers, depending upon the particular vinyl chloride being used and the porosity thereof.

Of course, the most important ingredients in the compositions of the present invention are the infrared reflecting pigments and, in particular, black infrared reflecting pigments. The most important infrared reflecting black pigment is O-1316 Black made by the Ferro Corporation of Cleveland, Ohio, which is a mixture of $Cr_2O_3$ and $Fe_2O_3$. By the use of such pigments, the heating of vinyl polymer articles, such as vinyl house siding, is lowered without changing the ultraviolet protection or the color thereof.

In order to get variation in colors of the vinyl polymer articles, other infrared reflecting pigments are employed in combination with the black pigment. As examples of other infrared reflecting pigments there may be named phthalocyanine blue, meteor light brown #7229 (Mn-Zn-Al-Cr oxides), chromium oxide green, bright golden yellow (Ti-Sb-Cr oxides), chromathal brown 5R, phthalocyanine green, cobalt blue #1, titanium dioxide, etc. The black pigment should be used in the vinyl polymer compositions in the preferred range of about 0.25 part to about 15 parts by weight, more preferably from about 0.5 part to about 10 parts by weight, the black pigment should be used at an effective level, based on the weight of the vinyl polymer or polymers in the composition. The other infrared reflecting pigments will be varied in amounts, depending upon the desired color wanted in the finished article. However, it should again be pointed out that the use of carbon black pigment is to be avoided, since it absorbs light in the ultraviolet, visible and infrared and is particularly bad for causing heat buildup in vinyl polymer articles. This is very vividly shown in the specific examples that follow hereinafter.

To further illustrate the present invention, the following specific examples are given, it being understood that this is merely intended in an illustrative and not a limitative sense. In the examples, all parts and percents are by weight unless otherwise indicated.

EXAMPLE I

In this example, a series of 12 capstock runs and 2 rigid, unplasticized PVC runs were made. Capstock is the outer weatherable layer in coextended vinyl house siding and vinyl windows, etc. In the runs, carbon black was used as the control and compared to an infrared reflecting black pigment obtained from the Ferro Corporation of Cleveland, Ohio and referred to as "O-1316 Black". The ingredients of each of the runs were mixed on a 2-roll mill for 3 minutes at 340° F. Each composition was preheated for 5 minutes at a temperature of 340° to 350° F. and then put in a press and formed into panels 6 in. ×6 in. ×0.45 in. They were pressed for 5 minutes. The heat buildup in each case was measured by the procedure referred to in the article entitled "Understanding The Cooling and Sizing Requirements of Vinyl House Siding" by J. W. Summers and R. J. Brown, published May, 1979 in Soc. of Plastic Engrs., Technical Papers, Vol. XXV, p. 403. The formulations in each run and the heat buildup results are given in the following table. In the table, the odd-numbered runs, namely 1, 3, 5, 7, 9, 11, and 13, contain carbon black and the even-numbered runs 2, 4, 6, 8, 10, 12 and 14 contain the infrared reflective black pigment in amounts which given the same color match as with carbon black. In the table, all the figures are parts by weight based on 100 weight parts of PVC.

TABLE I

| | RUN NO. | | | | | |
|---|---|---|---|---|---|---|
| | 1 | 2 | 3 | 4 | 5 | 6 |
| | COLOR | | | | | |
| INGREDIENTS | DARK BLUE | | DARK GREEN | | BEIGE | |
| PVC (polyvinyl Chloride) | 100 | 100 | 100 | 100 | 100 | 100 |
| Tin Thioglycolate Type Stabilizer | 3 | 3 | 3 | 3 | 3 | 3 |
| Di-(2-Ethyl Hexyl) Phthalate | 25 | 25 | 25 | 25 | 25 | 25 |
| Lubricants | 1.6 | 1.6 | 1.6 | 1.6 | 1.6 | 1.6 |
| Aluminum Silicate, Anhydrous | 10 | 10 | 10 | 10 | 10 | 10 |
| Titanium Dioxide | 12.5 | 12.5 | 8 | 8 | 15 | 15 |
| Carbon Black | 0.02 | — | 0.02 | — | 0.022 | — |
| Ferro Black ($Cr_2O_3$—$Fe_2O_3$) | — | 0.64 | — | 0.64 | — | 0.7 |
| Pigments A | 7.2 | 7.2 | — | — | — | — |
| Pigments B | — | — | 9.6 | 9.6 | — | — |
| Pigments C | — | — | — | — | 1.7 | 1.7 |
| Heat Buildup in °C. | 30° | 26° | 31° | 27° | 27° | 21° |

| | RUN NO. | | | | | | | |
|---|---|---|---|---|---|---|---|---|
| | 7 | 8 | 9 | 10 | 11 | 12 | 13 | 14 |
| | COLOR | | | | | | | |
| INGREDIENTS | TAN | | GRAY | | | | BROWN | |
| PVC (polyvinyl Chloride) | 100 | 100 | 100 | 100 | 100 | 100 | 100 | 100 |
| Tin Thioglycolate Type Stabilizer | 3 | 3 | 3 | 3 | 3 | 3 | 2 | 2 |
| Di-(2-Ethyl Hexyl) Phthalate | 25 | 25 | 25 | 25 | 25 | 25 | — | — |
| Lubricants | 1.6 | 1.6 | 1.6 | 1.6 | 1.6 | 1.6 | 3.75 | 3.75 |
| Aluminum Silicate, Anhydrous | 10 | 10 | 10 | 10 | 10 | 10 | — | — |
| Titanium Dioxide | 5 | 5 | 15 | 15 | 7 | 7 | 7 | 7 |
| Carbon Black | 0.08 | — | 0.05 | — | 0.3 | — | .3 | — |
| Ferro Black ($Cr_2O_3$—$Fe_2O_3$) | — | 2.56 | — | 1.54 | — | 9 | — | 9 |
| Pigments D | 9 | 9 | — | — | — | — | 1.7 | 1.7 |
| Pigments E | — | — | 9.6 | 9.6 | 1.7 | 1.7 | 1.5 | 1.5 |
| Processing Aid - Acrylic Type | — | — | — | — | 1.7 | 1.7 | — | — |
| Impact Modifier - Acrylic | — | — | — | — | — | — | 6 | 6 |
| Heat Buildup in °C. | 36° | 27° | 32° | 22° | 41° | 28° | 38° | 27° |

As can be seen from the above data, heat buildup is lowered up to as much as 13° C. when employing the infrared reflecting black pigment. This is a considerable improvement over the use of carbon black.

The vinyl polymer compositions of the present invention are most useful in the manufacture of house siding and other building siding, shutters, roof vents, camper tops, and other like materials which are subjected to prolonged exposure to sunlight. Further, the present compositions substantially reduce "oil canning" in vinyl house siding.

While the present invention has been described in terms of its specific embodiments, certain modifications and equivalents will be apparent to those skilled in the art and are intended to be included within the scope of the present invention, which is to be limited only by the scope of the appended claims.

We claim:

1. A composition adapted for use in the sunlight containing a homopolymer or copolymer of vinyl, halide and vinylidene chloride polymerized with each other or each with one or more polymerizable olefinic monomers having at least one terminal

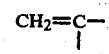

group, with or without a plasticizer for the polymer, a tin stabilizer, and color pigments, wherein the improvement consists essentially of the addition of an effective amount of an infrared reflecting black pigment of a mixture of chromic oxide and ferric oxide.

2. A composition as defined in claim 1 wherein the level of infrared reflecting black pigment is from about 0.25 part to about 15 parts by weight, based on 100 parts by weight of the polymer.

3. A composition as defined in claim 1 wherein the homopolymer is polyvinyl chloride.

4. A composition as defined in claim 1 wherein the plasticizer is di-(2-ethyl hexyl) phthalate.

5. A composition as defined in claim 1 wherein the plasticizer level is from about 10 parts to about 40 parts by weight, based on 100 parts by weight of the polymer.

6. A composition as defined in claim 1 wherein the monomers are vinyl chloride and ethyl acrylate.

7. A composition as defined in claim 4 wherein the homopolymer is polyvinyl chloride.

8. A composition as defined in claim 5 wherein the homopolymer is polyvinyl chloride.

9. A composition as defined in claim 7 wherein the color pigments are chromathal brown 5R and phthalocyanine green.

10. A composition as defined in claim 6 wherein the plasticizer is di-(2-ethyl hexyl) phthalate.

11. A composition as defined in claim 2 wherein the level of infrared reflecting black pigment is from about 0.5 part to about 10 parts by weight based on 100 parts by weight of the polymer.

12. A composition as defined in claim 7 wherein the tin stabilizer is a tin thioglycollate.

13. A process for reducing the heat build-up of polymeric materials upon exposure the sunlight said polymeric materials containing a homopolymer or a copolymer of vinyl halide and vinylidene halide polymerized with each other or each with one or more polymerizable olefinic monomers having at least one terminal 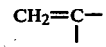 group, comprising incorporating therein an effective amount of an infrared reflecting black pigment comprised of a mixture of chromic oxide and ferric oxide.

14. A process of claim 13 wherein the amount of infrared reflecting black pigment is from about 0.25 parts to about 15 parts by weight, based on 100 parts by weight of the polymeric material.

15. A process of claim 13 wherein the polymeric material is polyvinyl chloride.

16. A process of claim 13 wherein the polymeric material is a copolymer of vinyl chloride and ethyl acrylate.

* * * * *

UNITED STATES PATENT AND TRADEMARK OFFICE
CERTIFICATE OF CORRECTION

PATENT NO. : 4,424,292

DATED : January 3, 1984

INVENTOR(S) : Elvira B. Rabinovitch & James W. Summers

It is certified that error appears in the above-identified patent and that said Letters Patent are hereby corrected as shown below:

Column 5, Claim 1, line 2, delete the comma after "vinyl".

Column 5, Claim 1, line 3, delete "chloride" and substitute therefor ---halide---.

Column 7, Claim 13, line 2, delete "the" and substitute therefor ---to---.

Correct spelling of co-inventors name from "Ravinovitch" to ---Rabinovitch---.

Signed and Sealed this

Twenty-seventh Day of November 1984

[SEAL]

Attest:

GERALD J. MOSSINGHOFF

Attesting Officer

Commissioner of Patents and Trademarks